United States Patent Office 2,698,103
Patented Dec. 28, 1954

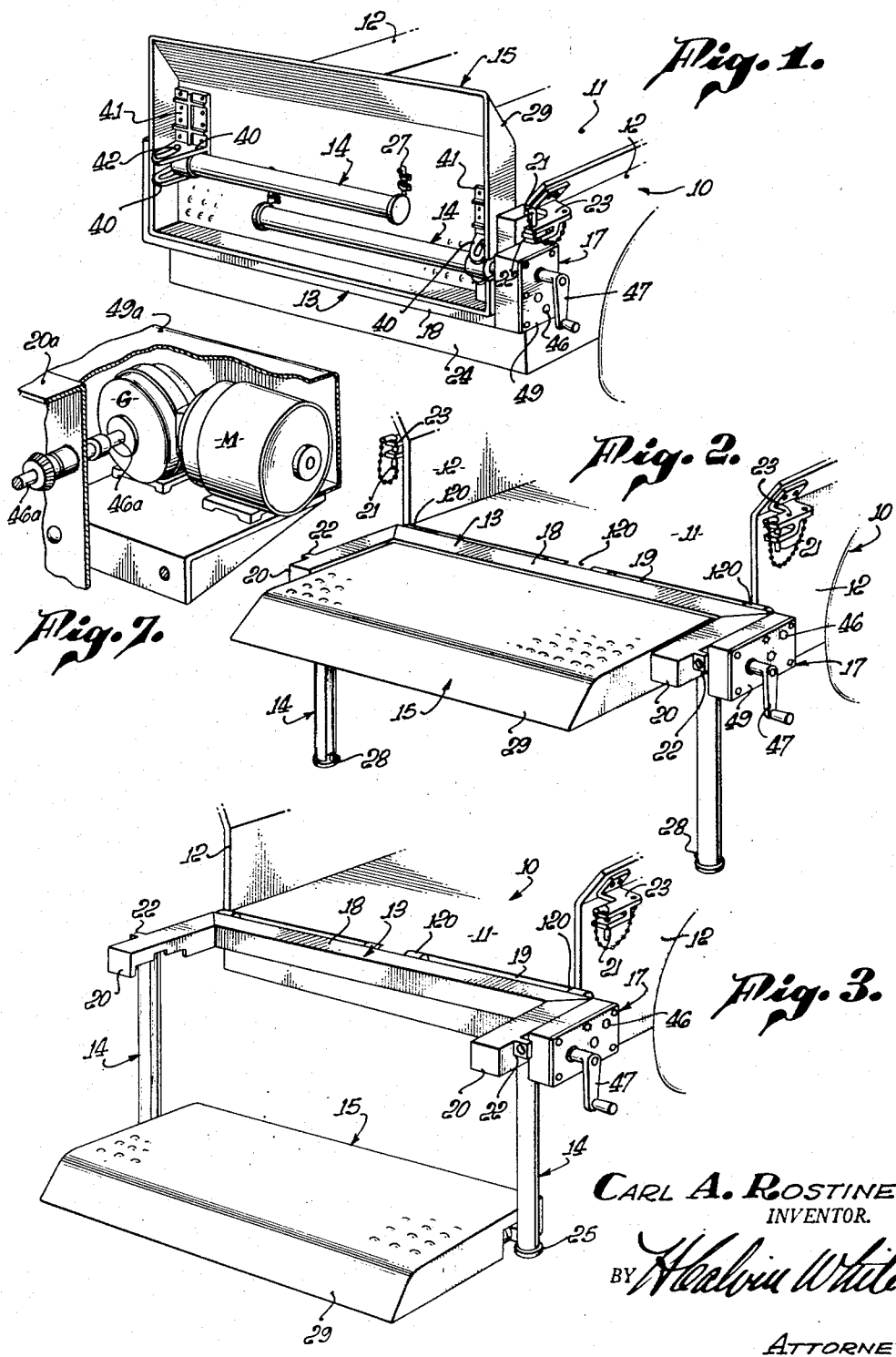

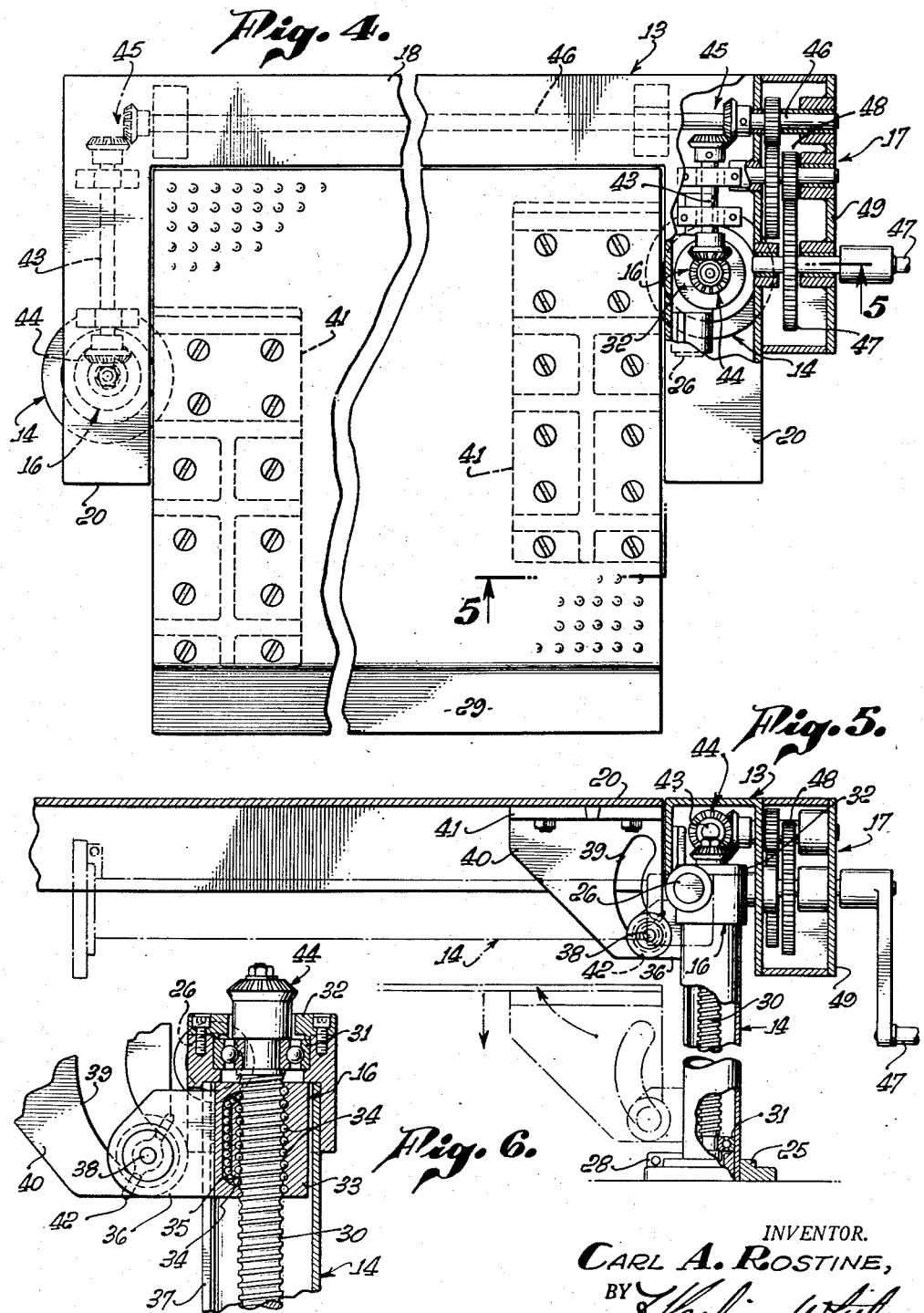

2,698,103

TRUCK TAIL GATE STRUCTURE

Carl A. Rostine, Gardena, Calif., assignor to Hampton Engineering Company, Los Angeles, Calif., a corporation of California Application May 26, 1952, Serial No. 290,030

8 Claims. (Cl. 214—75)

This invention relates to improved load-retaining gate structures for truck type vehicles.

The general object of the invention is to provide a device which as adapted in one condition to act as a rear or other load-retaining gate of a truck, trailer, or the like, and in a second condition to act as a loading elevator, for raising and lowering load units between ground and truck bed levels during a loading operation. Particularly contemplated is a device of this type which is very easily convertible between its gate and elevator conditions, and which in the gate condition is extremely compact to occupy little or no more space than the ordinary gate which is not also usable as an elevator. Certain additional features of the invention have to do with the formation of the elevating mechanism in a manner to handle very heavy loads, while at the same time being operable by a relatively small actuating force, so that the elevator may if desired be operated manually, to attain maximum simplicity in the overall structure.

Structurally, the device includes a frame section to be attached to the truck near a rear or other edge of its load receiving bed, and a platform section carried by the frame and movable between an upstanding closed-gate condition and a horizontally projecting condition in which it serves as a work support. In its horizontal condition, the platform is mounted to the frame for relative vertical movement between ground and truck bed levels. The platform is actuable vertically between these positions by suitable manual or power driven actuating mechanism carried by the frame.

The frame section of the device is preferably of essentially U-shaped configuration, having a main portion extending along one edge of the truck, preferably the rear edge, and a pair of arms projecting in a common direction from opposite ends of that main portion. The platform may then be received between the two arms of the U-shaped frame and supported at its opposite sides by mechanism carried by the two arms. Preferably, the frame carried two or more elongated hollow projections adapted to depend from the frame in its load-elevating condition, and containing a portion of the platform elevating mechanism. These hollow projections may be retractable when the device is being used as a gate, and in their depending conditions may serve as ground engaging legs for positively supporting the frame section from a ground surface. When the frame is of U-shaped configuration, the depending projections or legs are desirably mounted to the two arms respectively of the frame.

The platform elevating mechanism is preferably of a screw and nut construction of a type adapted to actuate the platform with the exertion of very little force. This mechanism may include one or more elongated vertically extending screws carried by the frame section and movably supporting coacting nuts which carry the vertically movable platform. The screws may be rotatable in unison by a suitable drive mechanism, to effect vertical displacement of the platform. Preferably, the screws are mounted within the above discussed depending projections or legs, and are retractable with the legs to a location adjacent the platform when the platform is used as a gate. To minimize the force necessary for actuation of the screw and nut mechanisms, these mechanisms are preferably of a type in which a series of ball bearings is provided between the screw and nut and within their interthread recesses to form a very low friction connection therebetween. The screws may be operatively interconnected for rotation in unison by rotary drive shaft means extending between the screws, along the three sides of the U-shaped frame section.

The above and other features and objects of the present invention will be better understood from the following detailed description of the typical embodiment illustrated in the accompanying drawings, in which:

Fig. 1 is a perspective view of a truck tail gate structure embodying the invention, the device being shown in its upstanding closed gate condition;

Fig. 2 is a view corresponding to Fig. 1, but showing the gate in its open condition, and with the work supporting platform at truck bed level;

Fig. 3 is a similar view showing the work supporting platform in its lowered position adjacent the ground;

Fig. 4 is an enlarged fragmentary plan view of the apparatus as seen in Fig. 2, the device being partially broken away to show the screw actuating mechanism;

Fig. 5 is a fragmentary vertical section taken on line 5—5 of Fig. 4;

Fig. 6 is a further enlarged fragmentary vertical section through the platform elevating screw and nut mechanism; and Fig. 7 is a fragmentary perspective view of the drive portion of a variational power-driven form of the invention.

Referring first to Figs. 1 to 3, the illustrated tail gate structure is shown applied to the rear of a truck 10, having the usual load supporting truck bed 11, and side walls 12 extending along its opposite sides. The tail gate structure itself includes a U-shaped frame section 13, a pair of legs 14 depending from opposite sides of the frame, a platform 15 adapted to serve as both a work elevating platform and a truck gate, screw and nut mechanism 16 contained within legs 14 for vertically actuating the platform (see Fig. 6) and a gear drive 17 for actuating the screw and nut mechanism (see Fig. 4).

The U-shaped frame 13 of the device is hollow, and includes a main elongated portion 18 extending transversely along the rear edge 19 of the truck bed, and a pair of parallel side portions or arms 20 projecting from that main portion of the frame. A number of hinges 120 attach the main transverse portion of the frame to the rear edge portion of the truck in a manner mounting the frame for swinging movement between the upstanding position of Fig. 1 and the rearwardly projecting position of Figs. 2 and 3. The frame is retainable in its upstanding closed gate condition by a pair of pins 21 which are adapted to pass through registering openings in lugs 22 carried by the frame arms 20 and brackets 23 attached to the truck side walls. In the rearwardly projecting Fig. 2 position of the frame, the main portion 18 of the frame and the rear edge surface 24 of the truck bed engage at a location beneath hinges 20, and preferably entirely across the width of the truck, to positively brace the frame against downward swinging movement beyond the illustrated horizontal position. The frame is thus maintainable in that horizontal position independently of the support offered by the depending legs 14, so that the device is useable whether or not the ground is sufficiently level to be engaged by the legs.

Legs 14 are hollow and preferably cylindrical, and have at their lower ends enlarged dimension base portions 25 for engaging a supporting ground surface. The legs are mounted to the two frame arms 20 respectively by pivotal connections at 26, which support them for swinging movement relative to the frame between the retracted positions of Fig. 1 and the projecting active positions of Figs. 2 and 3. In order to avoid interference of one leg with the other in their retracted positions, they may be mounted to their respective frame arms at different distances from the main transverse portion 18 of the frame. Each of the legs is releasably retainable in its retracted position by passage of a pin 27 carried by platform 15 through an opening in a lug 28 formed at the lower end of the leg.

Platform 15 is preferably of rectangular configuration, and is partially received within the space enclosed by U-shape frame 13. Desirably, platform 15 has a dimension transversely of the truck corresponding substantially to the distance between frame arms 20. The platform may have an inclined rear portion 29 for facilitating the movement of work onto and off of the platform.

The screw and nut mechanism 16 within each of the frame legs 14 includes a rotatable vertically extending screw 30. Each of these screws is mounted for rotation about the longitudinal axis of the leg within which it is contained by a pair of end ball bearings 31. Bearings 31 also bear against shoulders on the leg and screw in a manner retaining the screw against axial movement relative to the leg. The screw and bearings may be retained within the leg and in fixed axial position by an upper annular retaining element 32 attached to the top of the leg.

Each of the legs 14 contains, in addition to its screw 30, a platform supporting nut 33, which is received about the screw and is actuable vertically in accordance with rotation of the screw. To minimize the friction between each screw 30 and its associated nut 33, these elements are preferably of a type in which forces are transmitted between the screw and nut by a number of ball bearings 34 received within opposed spiral recesses in the screw and nut. As the screw and nut are relatively rotated, balls 34 roll along helical grooves formed in both the screw and nut, so that the overall result is a very low friction screw type connection between the two parts. When a particular ball has reached a predetermined end portion of the helical path in the nut, the ball is directed along a return passage 35, within the nut body and isolated from the screw, back to the opposite end of the nut thread or recess.

The two nuts 33 within legs 14 are attached to opposite sides of the platform 15 by lugs 36, which project from the nuts through vertically extending slots 37 at inner sides of the legs, and to locations beneath the platform. Each of these lugs 36 carries a screw 38, which extends through arcuate slots 39 formed in a pair of spaced depending lugs 40 of a bracket 41 carried by platform 15. As will be appreciated, screws 38 move along slots 39 in the platform carried bracket lugs as the legs 14 are swung between their retracted and active positions. Each of the screws 38 carries a wing nut 42, which may be tightened to clamp the nut and platform carried lugs 36 and 40 tightly together, in a manner retaining the legs in their active positions.

The screws 30 are rotated by a pair of shafts 43 contained within arms 20 of the frame. Each of these shafts has a bevel gear drive connection at 44 with the corresponding screw, and has a second bevel gear connection 45 with a drive shaft 46 extending horizontally within the main transverse portion 18 of the frame. Shaft 46 is in turn driven by a hand operated crank 47, through a train of reduction gears 48, contained within a housing 49 mounted at a side of one of the frame arms 20. Crank 47 is desirably mounted by and projects laterally from the gear containing housing 49.

When the apparatus is being used as a rear gate for the truck 10, the frame and platform are maintained in their upstanding Fig. 1 positions, and legs 14 are in their retracted positions adjacent the platform. If it is then desired to use the apparatus as an elevator structure, legs 14 are swung to and fastened by wing nuts 42 in their active Fig. 2 positions, and the frame and platform are swung downwardly to their horizontal condition. Rotation of crank 47 then acts through gears 48, shaft 46, and shafts 43, to rotate the screws in unison, in a manner elevating or lowering nuts 33 and opposite sides of platform 15 in unison. The platform may thus be actuated between its elevated and lowered Fig. 2 and Fig. 3 positions, to facilitate loading or unloading of the truck. By reason of the interconnection of the screws for actuation in unison, the platform is at all times maintained parallel to the plane of the truck bed.

Fig. 7 shows the drive portion of a variational form of the invention, in which the platform elevating and lowering mechanism is actuated by a small direct current motor M, through a reduction gear unit G, which drives a shaft 46a corresponding to drive shaft 46 of the first form of the invention. This motor and gear unit may be contained within a suitable housing 49a mounted to a side of one of the frame arms 20a.

I claim:

1. A tail gate structure for a truck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, a hollow projection depending from the frame in said second position, said platform being movable vertically relative to the frame when in said horizontal position to elevate and lower work between a location near the ground and the vehicle bed level, and mechanism located partially within said projection depending from the frame and operable to actuate said platform vertically relative to the frame in said horizontal position.

2. A tail gate structure for a truck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, tubular projections depending from the frame in said second position, said platform being movable vertically relative to the frame when in said horizontal position to elevate and lower work between a location near the ground and the vehicle bed level, and mechanism including a screw located within said tubular projections acting to support said platform from said frame and operable to actuate said platform vertically relative to the frame in said horizontal position.

3. A tail gate structure for a struck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, said frame being generally U-shaped to receive said platform and having a first portion extending along the rear edge of the vehicle bed and having a pair of generally parallel arms projecting from opposite ends of said first portion along the opposite sides of said platform, hollow tubular legs mounted to said arms of the frame for swinging movement relative thereto between retracted positions and depending ground engaging positions, said platform being movable vertically relative to the frame when in said horizontal position to elevate and lower work between a location near the ground and the vehicle bed level, and mechanism acting to support said platform from said arms of the frame and operable to actuate said platform vertically relative to the frame in said horizontal position, said mechanism including rotatable screws in said tubular legs, nuts movable along said screws and supporting the platform, and means for actuating said screws.

4. A tail gate structure for a truck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, said platform being movable vertically relative to the frame when in said horizontal position to elevate and lower work between a location near the ground and the vehicle bed level, and screw and nut mechanism carried by the frame and supporting said platform and operable to actuate said platform vertically relative to the frame in said horizontal position, said mechanism including a threaded screw and a threaded nut extending thereabout and ball bearings interposed between and within the thread recesses of said screw and nut.

5. A tail gate structure for a truck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, said platform being movable vertically relative to the frame when in said horizontal position to elevate and lower work between a location near the ground and the vehicle bed level, and mechanism operable to actuate said platform vertically relative to the frame in said horizontal position, said mechanism including a vertically extending actuating screw rotatably mounted to said frame, a nut actuated vertically by the screw and supporting the platform, and mechanism for rotating said screw.

6. A tail gate structure for a truck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, said frame being generally U-shaped to receive said platform and having a first portion extending along the rear edge of the vehicle bed and having a pair of generally parallel arms projecting from opposite ends of said first portion along the opposite sides of said platform, said platform being movable vertically relative to the frame when in said horizontal position to elevate and lower work between a location near the ground and the vehicle bed level, a pair of elevator mechanisms at opposite sides of the platform supporting the platform from the frame and operable to actuate said platform vertically relative to the frame in said horizontal position, drive shaft means mounted to the frame and extending along said U-shaped frame and three sides of the platform to interconnect said two mechanisms for actuation together, and means for actuating said mechanisms and drive shaft means to vertically move the platform.

7. A tail gate structure for a truck type vehicle having a work supporting bed, comprising a platform, a frame carrying said platform, means for mounting said frame to the rear of the vehicle for movement with the platform between a first position in which the platform acts as a rear gate of the vehicle and a second position in which the platform projects rearwardly and horizontally to act as a work support, said frame being generally U-shaped to receive said platform and having a first portion extending along the rear edge of the vehicle bed and having a pair of generally parallel arms projecting from opposite ends of said first portion along the opposite sides of said platform, hollow tubular legs mounted to said arms of the frame for swinging movement relative thereto between retracted positions and depending ground engaging positions, said platform being movable vertically relative to the frame when in said horizontal position to elevate and lower work between a location near the ground and the vehicle bed level, and mechanism acting to support said platform from said arms of the frame and operable to actuate said platform vertically relative to the frame in said horizontal position, said mechanism including rotatable screws in said tubular legs, nuts movable along said screws and supporting the platform, drive shafts extending along said first portion and along said two arms of the frame between said legs, gears transmitting power between said drive shafts and from said shafts to said screws so that the screws rotate in unison, and a crank for actuating said screws and shafts to vertically displace the platform.

8. The combination comprising a truck, a platform, a frame carrying said platform, means mounting said frame to the rear of the truck for swinging movement with the platform between an upstanding position in which the platform acts as a rear gate of the truck and a second position in which the platform projects rearwardly and horizontally to act as a work support, said frame being generally U-shaped and having a first portion extending along the rear edge of the truck bed and having a pair of generally parallel arms projecting from opposite ends of said first portion along the opposite sides of the platform, a pair of hollow legs mounted to the frame arms respectively for swinging movement between retracted and downwardly projecting positions, and screw and nut mechanisms partially contained within said legs acting to support the platform from the frame in said horizontal position and to vertically displace the platform between ground level and truck bed level positions.

References Cited in the file of this patent

UNITED STATES PATENTS

| Number | Name | Date |
|---|---|---|
| 1,280,090 | Schrottky | Sept. 24, 1918 |
| 1,826,513 | Fosdick | Oct. 6, 1931 |
| 1,967,482 | Schmidt | July 24, 1934 |
| 2,236,317 | Howland | Mar. 25, 1941 |
| 2,405,054 | Pringle | July 30, 1946 |
| 2,527,818 | Ives | Oct. 31, 1950 |
| 2,540,569 | Crise | Feb. 6, 1951 |
| 2,553,156 | Woodward | May 15, 1951 |